US009480240B2

(12) United States Patent
Sinko

(10) Patent No.: US 9,480,240 B2
(45) Date of Patent: Nov. 1, 2016

(54) DOG RESTRAINING APPARATUS AND METHOD

(71) Applicant: Dragon Gear 2.5 LC, Las Vegas, NV (US)

(72) Inventor: Kariann Sinko, Las Vegas, NV (US)

(73) Assignee: Dragon Gear 2.5 LC, Las Vegas, NV (US)

( * ) Notice: Subject to any disclaimer, the term of this patent is extended or adjusted under 35 U.S.C. 154(b) by 0 days.

(21) Appl. No.: 15/135,246

(22) Filed: Apr. 21, 2016

(65) Prior Publication Data

US 2016/0235038 A1     Aug. 18, 2016

Related U.S. Application Data

(60) Provisional application No. 62/182,346, filed on Jun. 19, 2015.

(51) Int. Cl.
*A01K 27/00* (2006.01)
*A01K 25/00* (2006.01)

(52) U.S. Cl.
CPC ............ *A01K 27/001* (2013.01); *A01K 25/00* (2013.01); *A01K 27/003* (2013.01); *A01K 27/005* (2013.01)

(58) Field of Classification Search
CPC .... A01K 25/00; A01K 27/002; A01K 27/00; A01K 15/04; A01K 27/001; A01K 27/003; A01K 27/005
USPC ........ 119/863, 856, 792, 793, 831, 832, 864
See application file for complete search history.

(56) References Cited

U.S. PATENT DOCUMENTS

| | | | |
|---|---|---|---|
| 1,474,231 A * | 11/1923 | Brown ................... | A01K 25/00 119/831 |
| 4,022,161 A | 5/1977 | Halperin | |
| 4,621,591 A | 11/1986 | Anderson et al. | |
| 4,741,288 A | 5/1988 | Anderson et al. | |
| 4,838,206 A * | 6/1989 | Anderson ............. | A01K 25/00 119/831 |
| 4,924,815 A | 5/1990 | Halla | |
| 4,941,313 A | 7/1990 | Anderson et al. | |
| 5,038,717 A | 8/1991 | Bent | |
| 5,088,272 A | 2/1992 | Anderson et al. | |

(Continued)

FOREIGN PATENT DOCUMENTS

| | | |
|---|---|---|
| CA | 2500149 A1 | 9/2006 |
| EP | 1216614 A2 | 6/2002 |
| GB | 2373986 A | 10/2002 |

*Primary Examiner* — Yvonne Abbott-Lewis
(74) *Attorney, Agent, or Firm* — Lance M. Pritikin

(57) ABSTRACT

Embodiments of a dog restraining apparatus comprise a dog collar and a collar positioning assembly. The collar is configured to attach to a leash at a location behind the dog's head when the collar is secured around the dog's neck. The collar positioning assembly includes an alignment strap having ends attachable to the collar at respective collar attachment locations such that the alignment strap is extendable across the dog's nose bridge when the dog collar is secured around the dog's neck The collar attachment locations may be adjustable along the collar. The alignment strap may have a continuous or non-continuous bead of elastomer disposed on its interior surface to frictionally engage the dog's nose. The collar positioning assembly may be readily detachable from, and re-attachable to, the collar. Attachment of the strap ends may be facilitated by intervening structures such as strap end loops, O-rings and releasable collar attachment loops.

18 Claims, 10 Drawing Sheets

(56) References Cited

U.S. PATENT DOCUMENTS

| | | | |
|---|---|---|---|
| 5,317,989 A * | 6/1994 | Swanson | A01K 27/003 119/792 |
| 5,690,059 A | 11/1997 | Woods | |
| 5,732,660 A | 3/1998 | David et al. | |
| 5,992,352 A | 11/1999 | Borchelt et al. | |
| 6,595,156 B1 * | 7/2003 | Curran | A01K 25/00 119/792 |
| 6,796,274 B1 | 9/2004 | Moynihan, III | |
| 7,637,231 B2 | 12/2009 | Grayson | |
| 7,891,322 B2 * | 2/2011 | Bennett | A01K 27/002 119/856 |
| 7,930,997 B2 * | 4/2011 | Ashby | A01K 27/002 119/831 |
| 9,021,991 B2 * | 5/2015 | Cogley | A01K 25/00 119/831 |
| 2008/0184943 A1 | 8/2008 | Brauer | |
| 2010/0024743 A1 * | 2/2010 | Wang | A01K 25/00 119/832 |
| 2010/0294212 A1 | 11/2010 | Therrian | |
| 2013/0074782 A1 | 3/2013 | Marran | |
| 2015/0237831 A1 | 8/2015 | Beck | |

\* cited by examiner

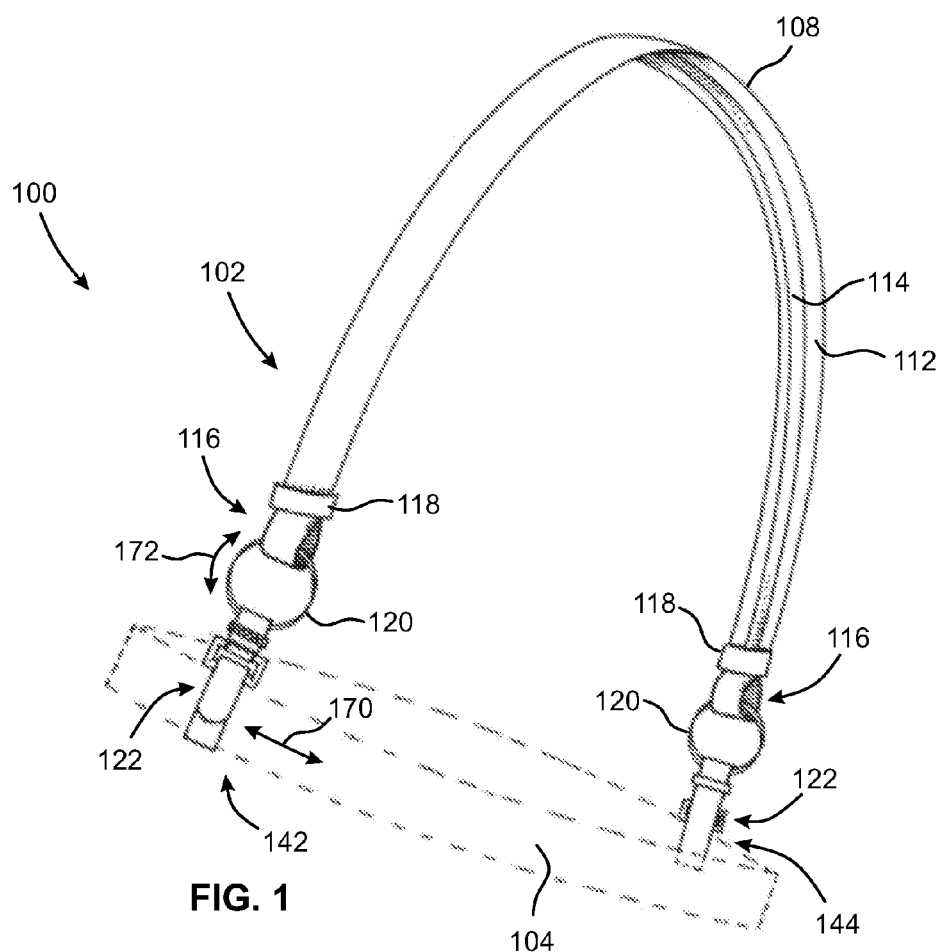
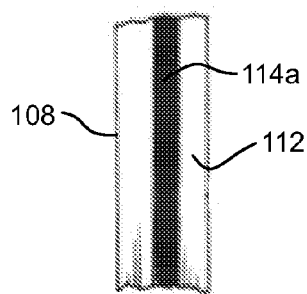
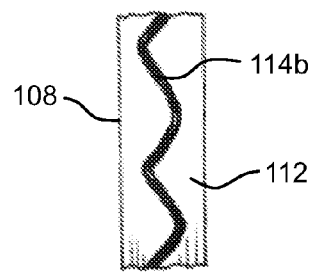
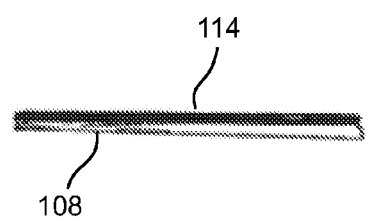
FIG. 1
FIG. 2   FIG. 3   FIG. 4

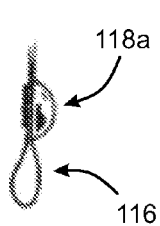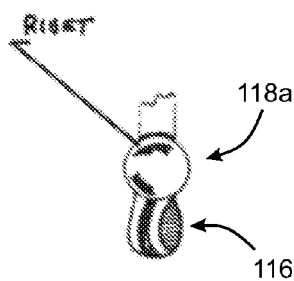
FIG. 5A  FIG. 5B
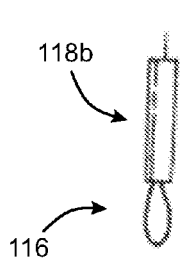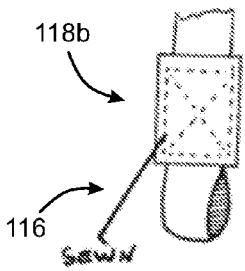
FIG. 6A  FIG. 6B
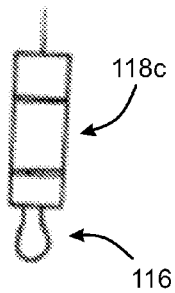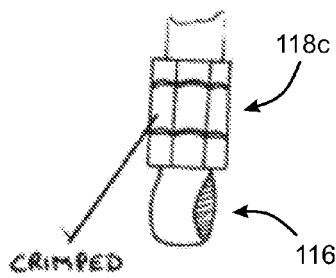
FIG. 7A  FIG. 7B
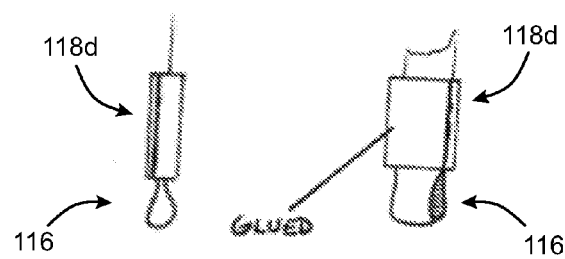
FIG. 8A  FIG. 8B

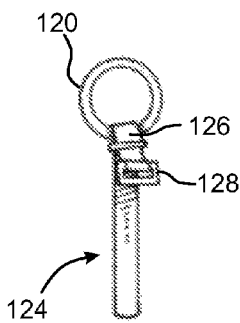
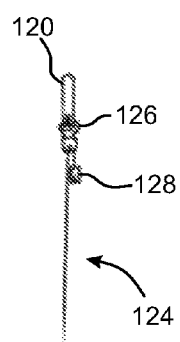
FIG. 9A    FIG. 9B
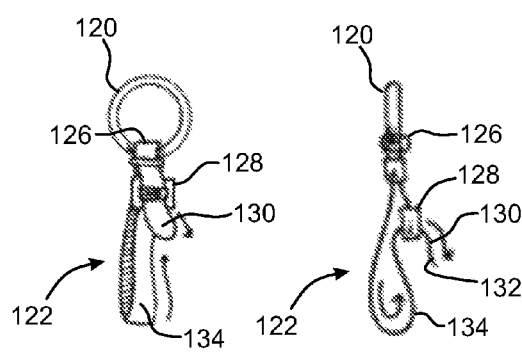
FIG. 10A    FIG. 10B
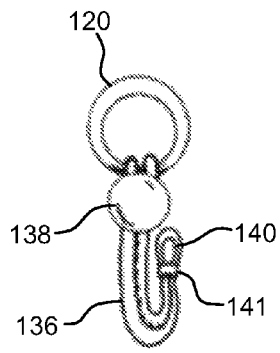
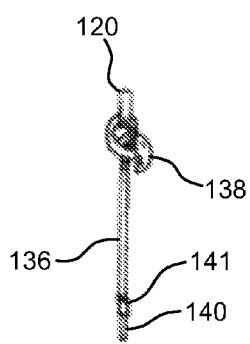
FIG. 11A    FIG. 11B
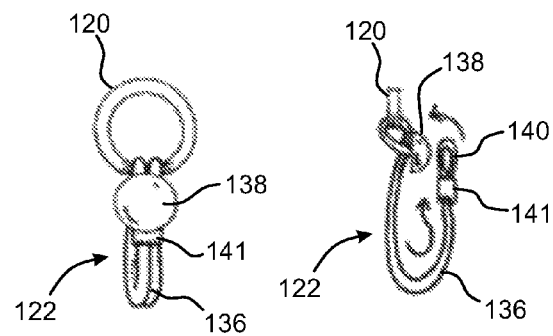
FIG. 12A    FIG. 12B

DOG RESTRAINING APPARATUS AND METHOD

RELATED APPLICATIONS

This application claims the benefit of U.S. Provisional Application No. 62/182,346 filed Jun. 19, 2015, the content of which is incorporated by this reference in its entirety for all purposes as if fully set forth herein.

TECHNICAL FIELD

The present invention relates generally to systems and methods for restraining animals. More particularly, the present invention relates to a system and method to optimize the position of a collar on a dog for training purposes.

BACKGROUND

Walking is beneficial to the physical and mental health of both the dog and dog owner. Cardiovascular exercise from walking is widely appreciated, and although less apparent, the socialization skill enhancement when dogs meet other dogs and dog owners is as valuable to both pet and pet owner.

Some restraint placed on the dog is a practical necessity in urban areas, both because of leash law regulations and traffic dangers. Restraint is also frequently required during initial stages of obedience training particularly with younger dogs. Such restraint is not natural, and collar and lead will typically trigger a pulling response as the natural reflex to restraint.

The majority of dog walking products seek control over the dog by placing some type of restraint around the muzzle, neck or chest. Through such devices, the pet owner seeks to control, restrain, correct, and direct by pulling the dog backwards by its chest or lower neck, or by pulling its head or nose/snout in a downward direction—and in a direction opposite from where the dog is presently heading.

Upon sensing this pulling force, the dog involuntarily reacts by pulling against the restraint in the opposite direction (termed an "Opposite Reflex Reaction"). This reflexive response includes a lowering of the head followed by a shift in weight and strength to the front of the body, and a leaning forward away from the pulling force of the pet owner attempting to walk the dog. Walking the dog becomes an adversarial process.

Interspersed between this tug-of-war conduct, the dog is "in the lead," out in front, looking around, tearing from smell to smell. Where the dog walks and pulls ahead, the dog is not in a balanced and appropriately positioned relationship with the owner.

SUMMARY

The present invention provides a positioning strap attached to the dog collar that extends across the bridge of the dog's nose, forcing the collar to the highest possible position on the dog's neck. Pulling on the leash creates a gentle pressure around the entire neck, but landing mostly at the base of the ears on the back of the dog's head. The dog naturally lifts up his or her head, stopping further forward motion.

It is to be understood that the invention is not limited in its application to the details of construction and the arrangement of components described hereinafter and illustrated in the drawings and photographs. Those skilled in the art will recognize that various modifications can be made without departing from the scope of the invention.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 1 is a diagrammatic perspective view of a dog restraining apparatus in accordance with one non-limiting embodiment of the present invention;

FIG. 2 is a diagrammatic plan view of a portion of an alignment strap with an elastomeric frictional engagement element exposed thereon along a linear pathway;

FIG. 3 is a diagrammatic plan view of a portion of an alignment strap similar to that shown in FIG. 2, but in which the elastomeric frictional engagement element follows a tortuous pathway;

FIG. 4 is a diagrammatic side view of a portion of an alignment strap such as the one shown in FIGS. 2 and 3;

FIG. 5A is a diagrammatic side view of one example of an end loop of an alignment strap, wherein the end loop securement element is in the form of a rivet;

FIG. 5B is a diagrammatic perspective view of the end loop shown in FIG. 5A;

FIG. 6A is a diagrammatic side view of one example of an end loop of an alignment strap, wherein the end loop securement element is in the form of a stitching;

FIG. 6B is a diagrammatic perspective view of the end loop shown in FIG. 6A;

FIG. 7A is a diagrammatic side view of one example of an end loop of an alignment strap, wherein the end loop securement element is in the form of a crimp;

FIG. 7B is a diagrammatic perspective view of the end loop shown in FIG. 7A;

FIG. 8A is a diagrammatic side view of one example of an end loop of an alignment strap, wherein the end loop securement element comprises an adhesive;

FIG. 8B is a diagrammatic perspective view of the end loop shown in FIG. 8A;

FIG. 9A is a diagrammatic perspective view of one example of a collar attachment loop of the hook-and-loop buckle fastener type, shown in opened configuration and cinched to an O-ring;

FIG. 9B is a diagrammatic side view of the collar attachment loop and O-ring shown in FIG. 9A;

FIG. 10A is a diagrammatic perspective view of the collar attachment loop and O-ring of FIG. 9A, but wherein the collar attachment loop is shown in the process of being placed in closed configuration;

FIG. 10B is a diagrammatic side view of the collar attachment loop and O-ring shown in FIG. 10A;

FIG. 11A is a diagrammatic perspective view of one example of a collar attachment loop of the elastic-cord button-and-eyelet fastener type, shown in opened configuration and cinched to an O-ring;

FIG. 11B is a diagrammatic side view of the collar attachment loop and O-ring shown in FIG. 11A;

FIG. 12A is a diagrammatic perspective view of the collar attachment loop and O-ring of FIG. 11A, but wherein the collar attachment loop is shown in the process of being placed in closed configuration;

FIG. 12B is a diagrammatic side view of the collar attachment loop and O-ring shown in FIG. 12A;

DETAILED DESCRIPTION OF THE PREFERRED EMBODIMENTS

Figure 13:
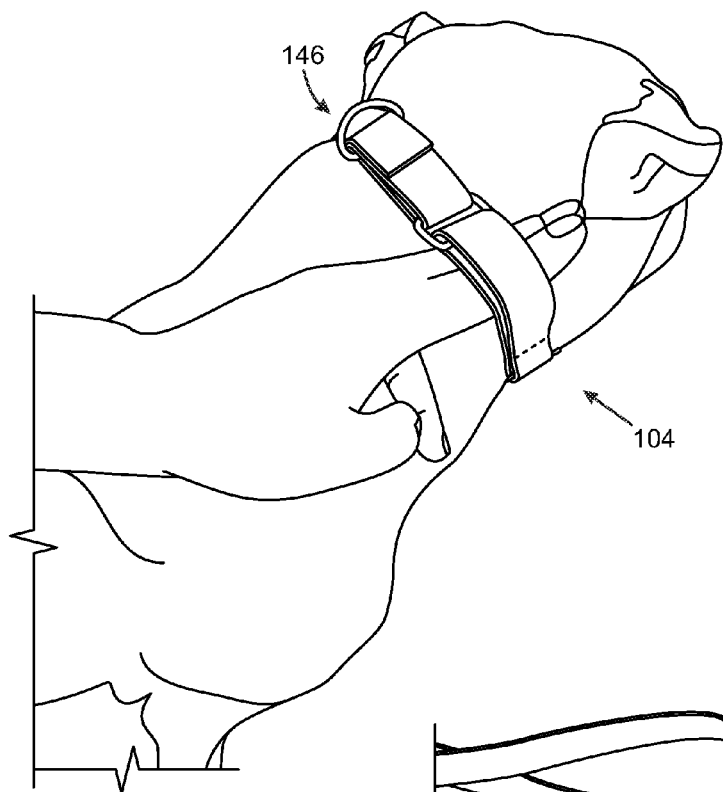
FIG. 13 is a diagrammatic perspective view of a training collar being adjusted to comfortably fit around the highest point on the dog's neck, while extending under the jaw in the front.

Referring now to the drawings, like reference numerals designate identical or corresponding features throughout the several views.

The drawing shows a number of features of the present inventive dog collar positioning strap. FIG. 1 shows a suggested manner of attachment of the alignment strap (also identified in this application as a "positioning strap") to a dog collar, the dog collar shown in phantom. FIGS. 5A through 12B provide additional structural details regarding the alignment strap as well as alternative components to attach the alignment strap to the dog collar.

In FIG. 1, the alignment strap 108 extends as a narrow strip from a first location of attachment 142 on the dog collar 104 to a second location of attachment 144. As shown in FIGS. 2-4, the interior surface 112 of the alignment strap 108 may have a thin bead or strip 114 of rubber extending along the entire length, or a portion of the length, of the strap 108.

The path or manner of extension of the rubber bead may vary. FIG. 3 depicts one bead formed as a wavy or zigzag line of rubber. An alternative embodiment depicted in FIG. 2 shows a substantially straight line extending the length of the strap. The rubber or rubber-like material provides a frictional surface resistive to sliding over the dog's fur, to assist in maintaining the proper position of the strap 108 on the dog's nose. The term "dog's nose" as used in one or more portions of this disclosure may be synonymous with the dog's muzzle, as illustrated, for example, in the associated figures.

Each end of the alignment strap may terminate with an attachment to an O-ring 120. A preferred manner of attachment has the flat strip extending through the O-ring and then doubling back on itself and secured. FIGS. 5A through 8B illustrate several possible techniques for securing the strap ends about the O-ring, including the use of a rivet, sewing the end to the strap, crimping the doubled-back construction together, and gluing the double-backed end to the strap. The end loops formed at each end of the alignment strap are preferably sufficiently open to enable free movement of the O-ring within the end loops.

A collar attachment loop 122 may also attach to the O-ring, and is then used to attach the alignment strap 108 to the dog collar 104. Unlike the end loop attachment of the alignment strap to the O-ring, the collar attachment loop 122 is preferably adjustable, permitting variance in the location of attachment to the dog collar. Such location may vary depending upon the size and shape of the dog's head and neck.

In the embodiment of FIG. 1, the alignment strap 108 attaches to a dog collar 104 using a hook-and-loop buckle cinch strap, also shown in FIGS. 9A through 10B. The cinch portion 126 of the securement strap 124 loosely secures the securement strap 124 to the O-ring, in a manner permitting relative movement. The extending portion 130 of the securement strap 124 wraps around the dog collar 104 and then extends through a buckle 128. The extending portion 130 of the securement strap 124 is then pulled to tighten the loop around the dog collar 104, with the rear surface 132 of the extending strap portion attaching to the top surface 134 of the adjacent strap using a hook-and-loop attachment interface, securing the tightened attachment loop 122.

FIGS. 11A-12B depict an alternative mechanism for the attachment loop. An elastic cord 136 formed as a loop includes a button 138 at one end and an eyelet 140 at the other. The button end loops around the O-ring 120 and the eyelet end extends around the dog collar 104, with the extending eyelet 140 finally being secured over the button 138, thereby attaching the dog collar 104 to the O-ring 120.

FIGS. 13-24 illustrate a presently preferred manner of using the dog collar positioning assembly 102 of the present invention. The training collar 104 in FIG. 13 is adjusted to comfortably fit around the highest point on the dog's neck, under the chin in front, and at the highest point on the back of the neck, where the base of the ears meet the back of the neck. The training collar 104 should preferably be loose enough that two fingers easily slide underneath the collar 104 without choking the dog. Once the training collar achieves the proper fit, it is removed from the dog to permit attachment of the positioning strap.

Figure 14:
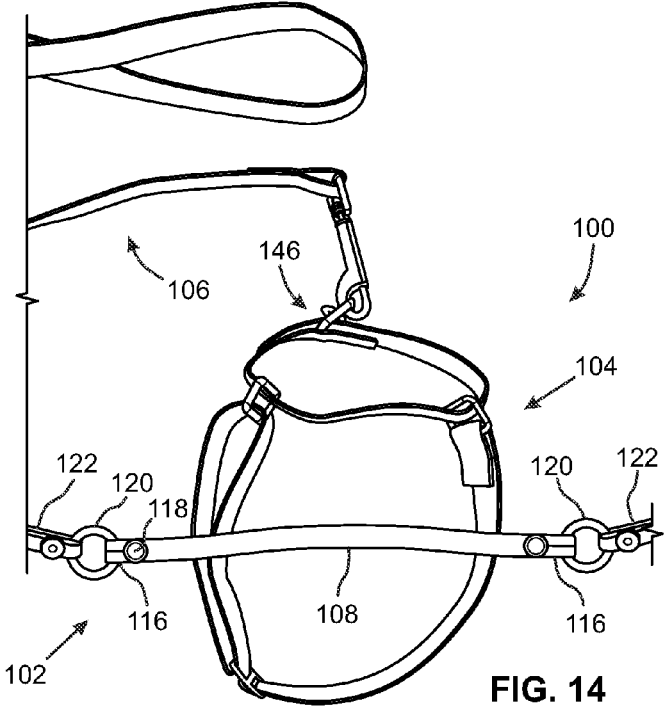
FIG. 14 is a diagrammatic plan view of a dog restraining apparatus in accordance with one non-limiting embodiment of the present invention, shown with a training collar and leash.

In FIG. 14, the training collar 104 is shown placed on a flat surface with the leash 106 attached. The positioning strap is centered and placed over the training collar 104, the ends positioned at the 3 o'clock and 9 o'clock positions, where the location of leash attachment 146 is at 12 o'clock.

Figure 15:
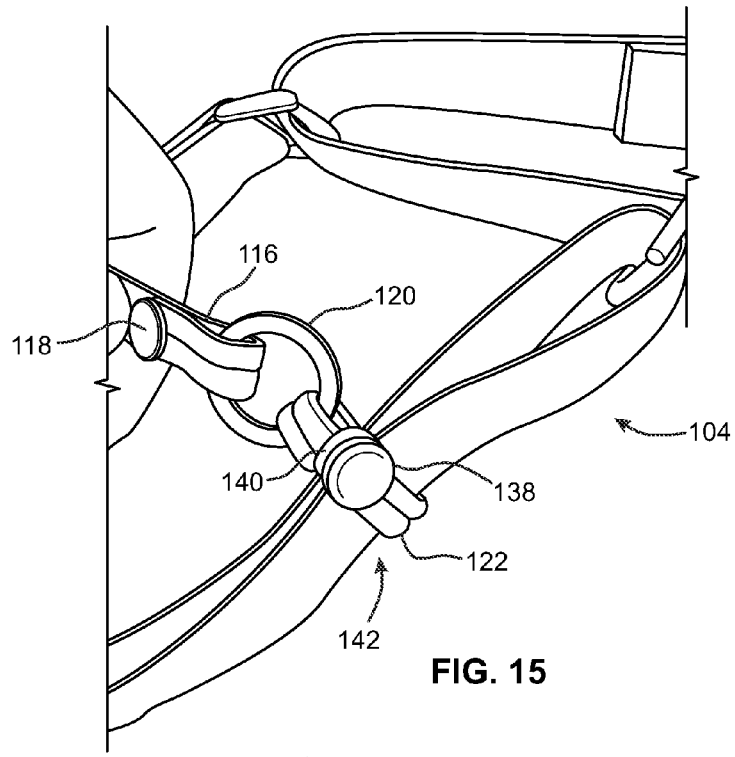
FIG. 15 is a diagrammatic partial perspective view showing an example attachment of the alignment strap end to a dog collar, including a depiction of optionally preferred intermediate features such as an end loop, O-ring and collar attachment loop.
Figure 16:
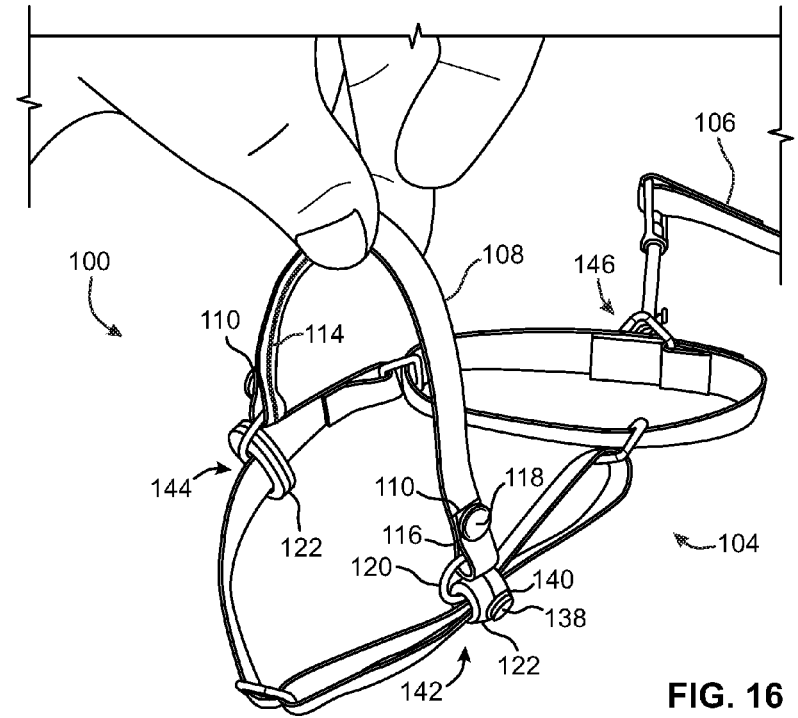
FIG. 16 is a diagrammatic perspective view of one non-limiting example of a fully-assembled dog restraining apparatus, with a leash attached to the dog collar.

The positioning strap is attached in FIG. 15 using an elastic cord 136 having a button 138 and eyelet 140, with the cord looping around the training collar 104 and then secured over the button 138. Upon securing both ends, FIG. 16 shows the positioning strap attached to the training collar.

The training collar is then placed over the dog's head, and returned to the position discussed above and shown in FIGS. 13 and 17. The looseness in the training collar is again demonstrated by the two fingers shown inserted under the training collar. The positioning strap 108 gently rests across the bridge of the dog's nose and under the dog's eyes.

Figure 17:
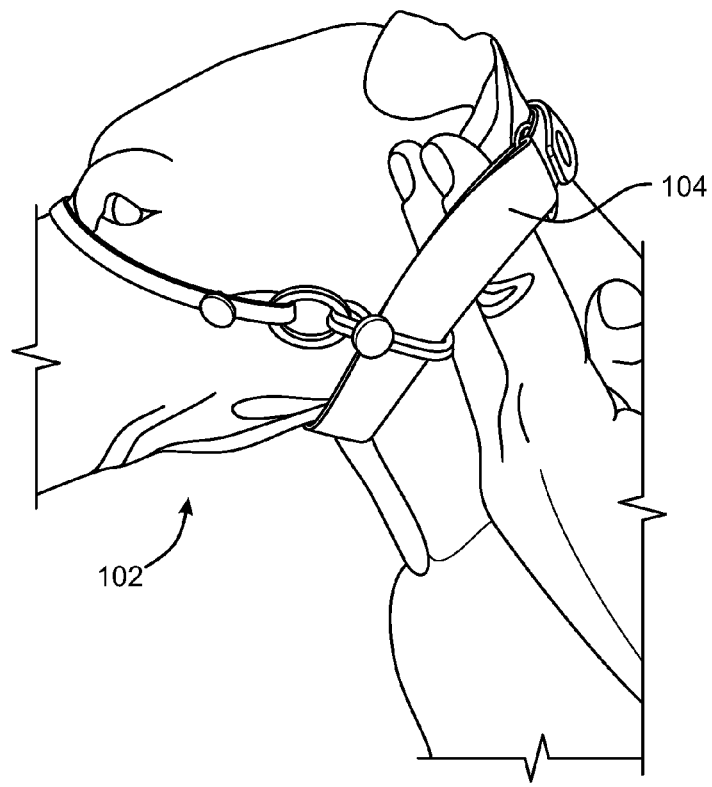
FIG. 17 is a diagrammatic side view of a preferred deployment of an example dog restraining apparatus on a dog.
Figure 18:
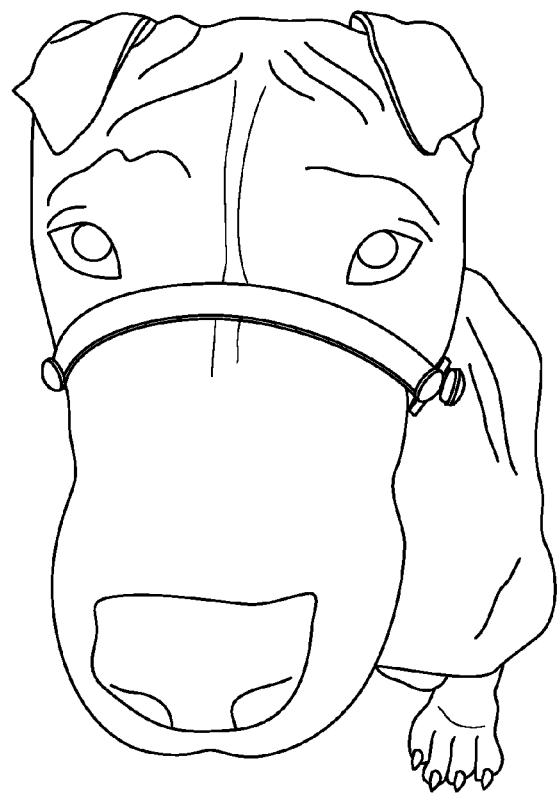
FIG. 18 is a diagrammatic front view of the preferred deployment shown in FIG. 17.
Figure 19:
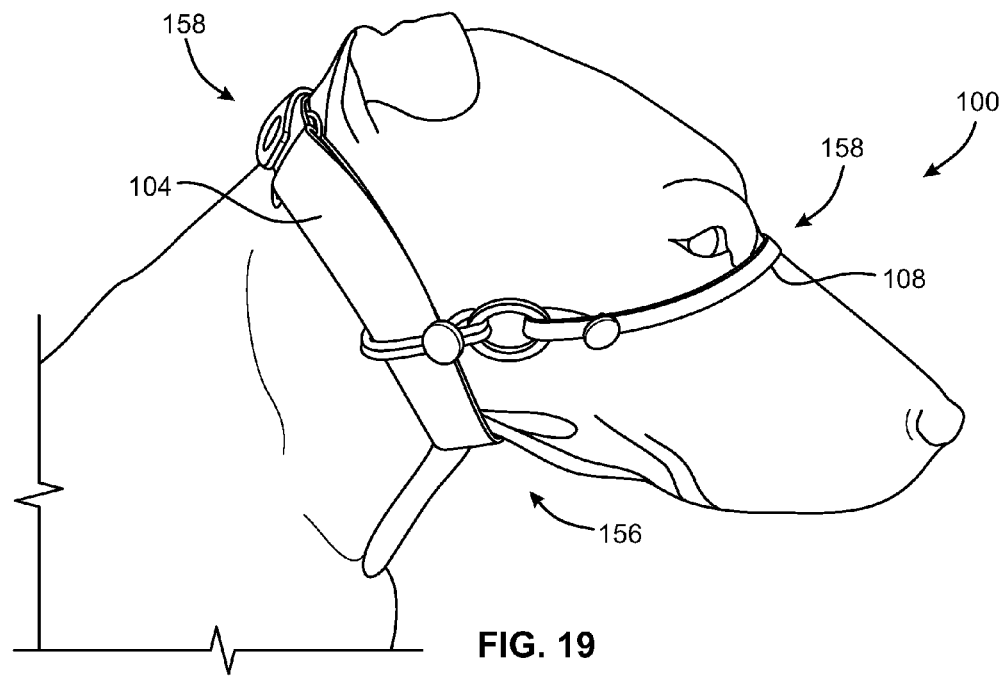
FIG. 19 is a further diagrammatic side view of a preferred deployment of an example dog restraining apparatus on a dog.
Figure 20:
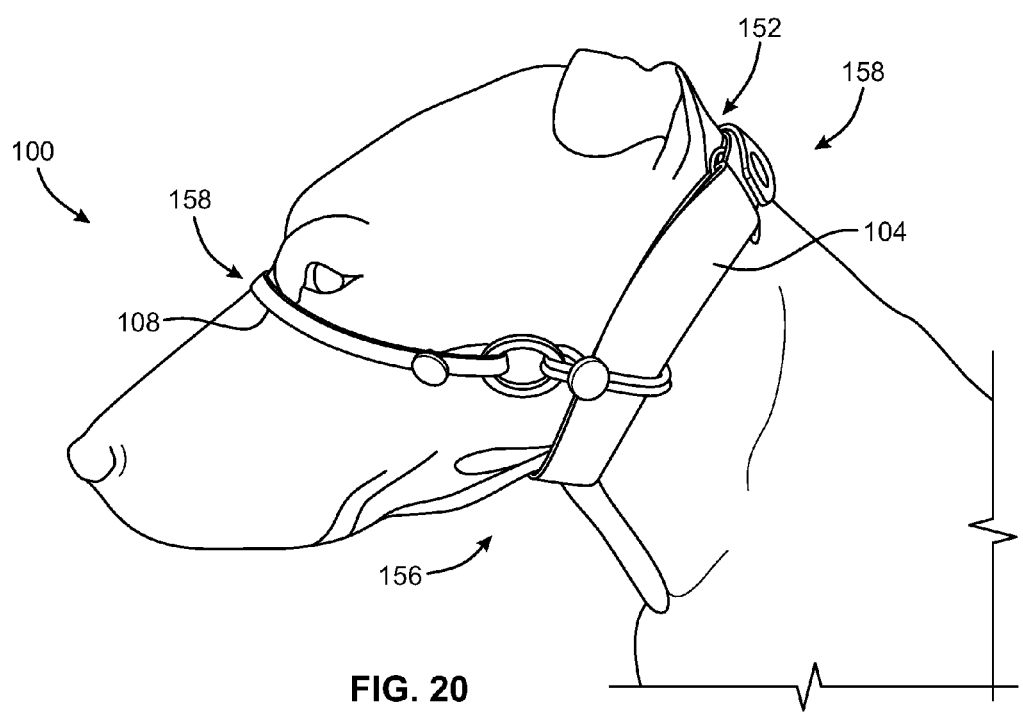
FIG. 20 is a diagrammatic side view of the preferred deployment shown in FIG. 19, but from the opposite side.
Figure 21:
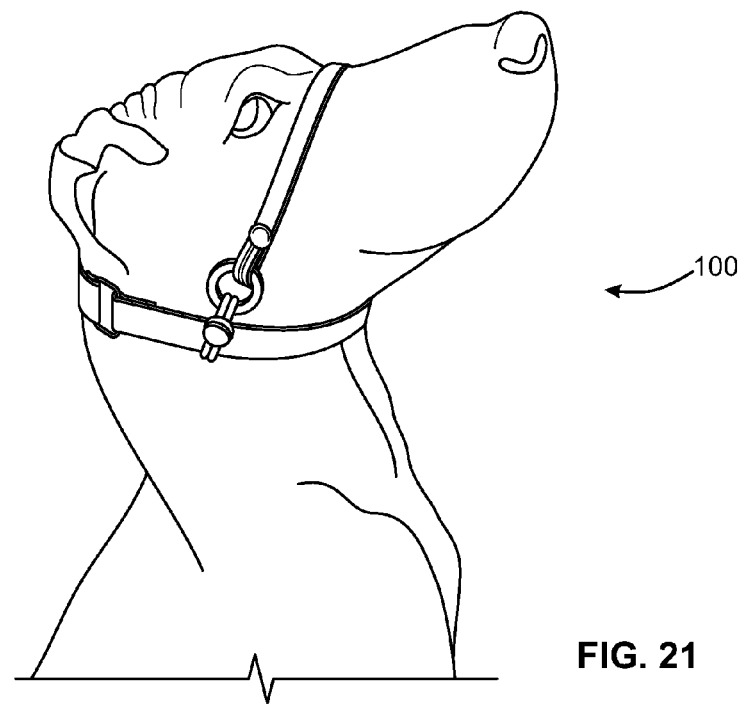
FIG. 21 is a diagrammatic perspective view of the preferred deployment shown in FIG. 19.

FIGS. 17 and 18 show a properly placed training collar and positioning strap in accordance with a preferred embodiment of the present invention. The O-rings are positioned on both sides to rest below the ears and on top of the dog's cheek at the angle of the jaw. The positioning strap is preferably adjusted to lay across the nose and evenly on both sides of the face. The positioning strap may be reversible, and either side of the strap can lie upon the dog's nose. Initially the rubberized side of the positioning strap may be preferred, contacting the dog's fur to create gentle, natural friction and help maintain proper strap position. FIGS. 19-21 show a properly positioned training collar and positioning strap from several different vantage points.

Figure 22:
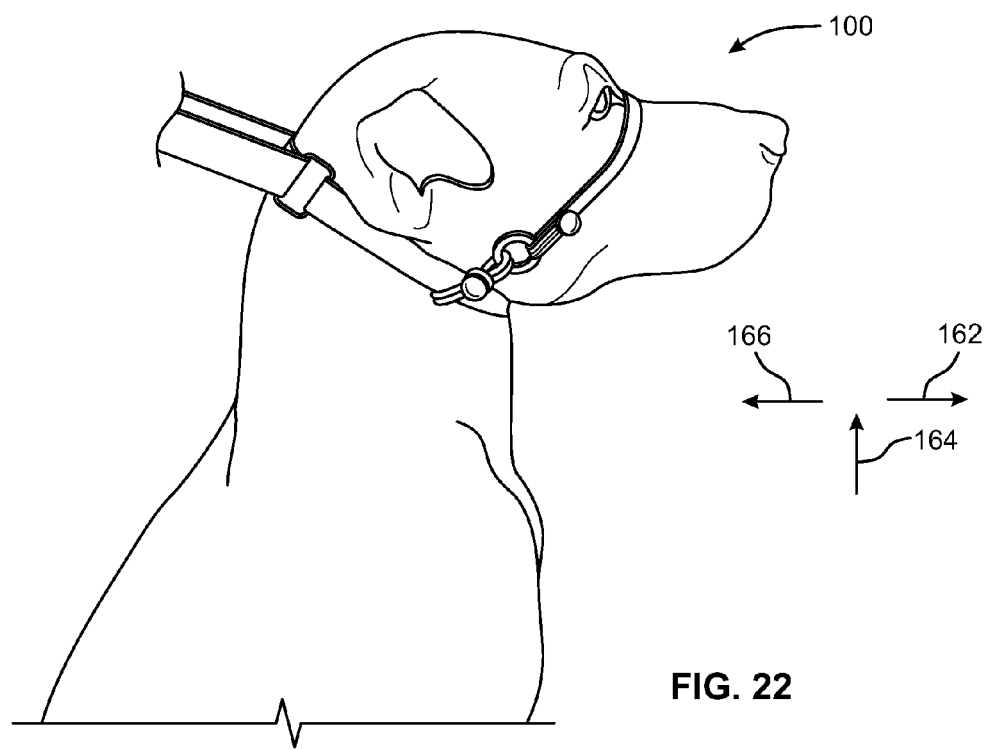
FIG. 22 is a diagrammatic perspective view of a preferred deployment of a dog restraining apparatus, showing the alignment strap positioning the dog collar high on the neck, so that forward pulling by the dog results in application of pressure to the back of the dog's neck behind the ears with no restriction of the jaw.

Once the dog collar and positioning strap are properly placed on the dog, the dog owner should immediately commence to walk the dog without permitting the dog to walk ahead of the owner. FIG. 22 shows the dog collar and positioning strap kept high on the neck and at the base of the back of the ears. Should the dog pull ahead of the owner or move off to the side, tension on the leash will immediately apply pressure to the back of the dog's neck, where the ears meet the neck.

Such pressure will cause the dog to naturally slow down, and limit or cease any further forward motion (e.g., in direction 162) that is in conflict with the person walking the dog. If the dog were to continue with the undesired forward movement, the force applied by the combination of the dog collar and positioning strap will result in the continued application of pressure to the back of the neck, and may initiate pulling of the dog's head further up (164) and back (166), providing the unpleasant sensation to the dog that it will shortly be flipped upside down.

Figure 23:
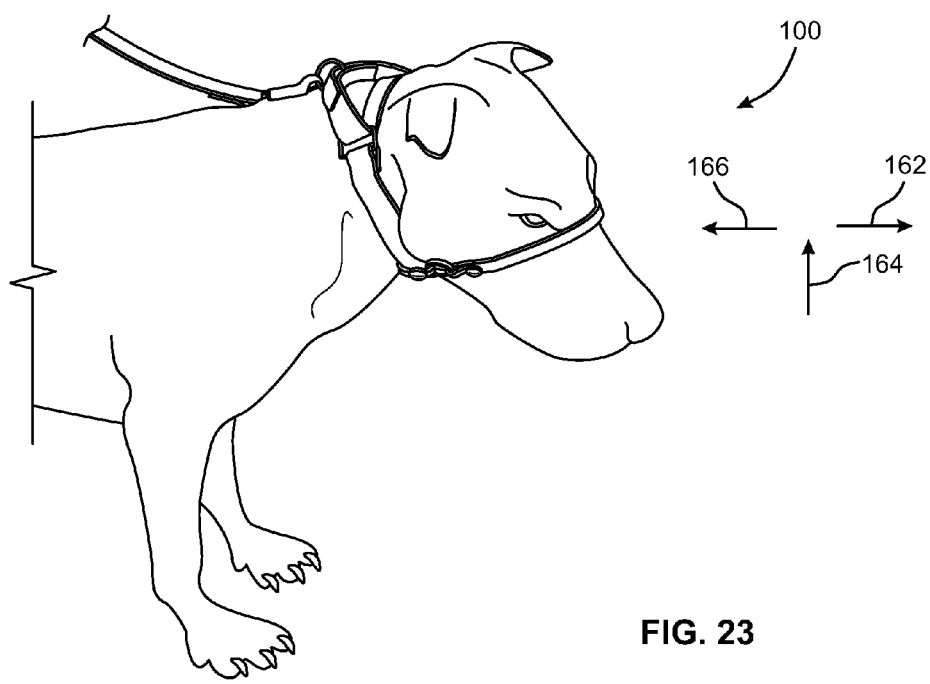
FIG. 23 is a further diagrammatic perspective view of a preferred deployment of a dog restraining apparatus in accordance with the present invention, wherein the alignment strap positions the dog collar high on the dog's neck.
Figure 24:
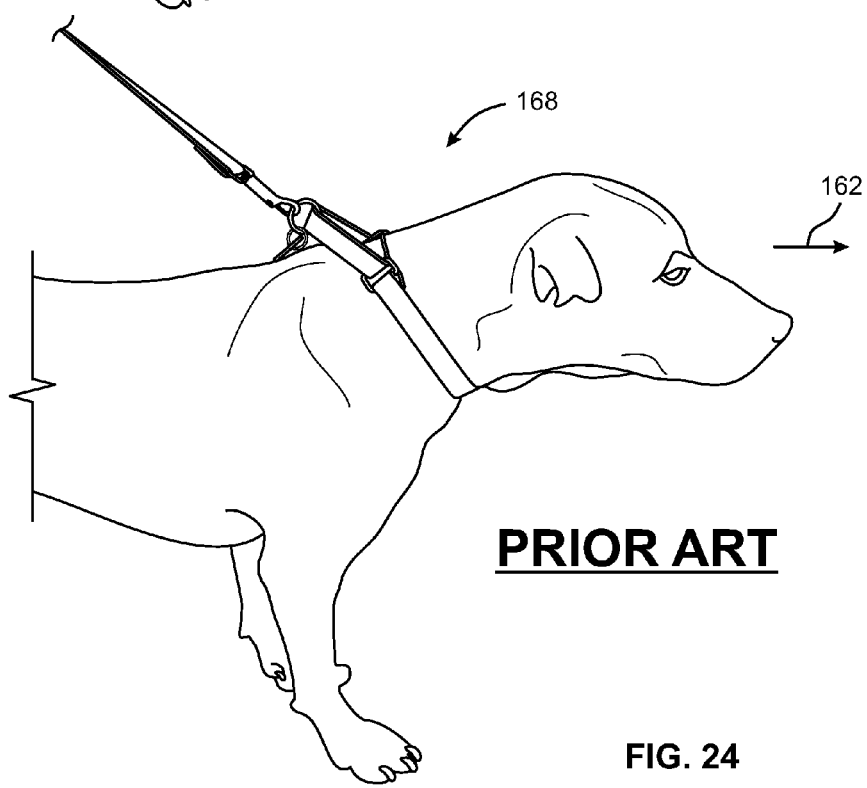
FIG. 24 is a diagrammatic perspective view of a prior art deployment of a dog collar on a dog, whereby a forward-pulling response typically results from the application of rearward tension on the leash.

The differences in structure and use between a dog wearing a preferred embodiment of an apparatus in accordance with the present invention and a dog wearing a conventional dog collar are shown by comparing FIGS. 23 and 24. The collar positioning strap of the present invention maintains the training collar at the highest point on the dog's neck (see FIG. 23). The application of gentle and minimal pressure to the back of the head, where the ears meet the neck, apparently provides control and guidance feedback to the dog. Such pressure is provided in an upward (164) and backward (166) direction.

The positioning of the alignment strap across the bridge of the dog's nose creates a focal point for the dog and naturally encourages the dog to stand erect, head up, and looking straight ahead. Pulling up on the leash applies pressure on the dog's head from eye to ear, in an upward, backward motion, eventually landing at the back of the dog's neck at the very base of the dog's ears. The head of the dog naturally lifts, and the dog ceases to travel forward—the dog may even begin to back up in order to stop the feeling of being pulled over backwards.

Applying pressure to the back of the dog's head around the base of the ears simulates the manner in which the dog was first carried while a puppy. Engaging this inherent reaction can result in a state of submission by the dog, as the dog is uncertain about both its posture and positioning, and cannot move freely without experiencing continued and increasing discomfort. Such location on the back of the dog's head can be thought of as "the sweet spot," due to its power to render the dog compromised in terms of the dog's physical abilities and confidence, and placing the dog into a submissive state.

In comparison, conventional training collars 168 tend to ride low on the dog's neck (see FIG. 24) or wrap around the dog's jaw and snout. When the owner pulls on the leash, the leash either pulls back on the dog, or, if the leash is in front of the dog, pulls down on the dog's head. The result of such pulling, as experienced by the dog, is either a resistance to the chest, a squeezing to the throat area or a pulling of the nose downward. An involuntary "Opposite Reflex Reaction" then occurs, resulting in the dog pulling in a direction opposite from that desired by the owner. While this natural reaction is advantageous in the training and operation of sled dogs, it is undesirable in the training and management of domestic dogs. The entire dog walk becomes an adversarial affair, one that is both tiring and discouraging for the owner.

Use of the dog restraining apparatus 100 of the present invention teaches the dog to walk in alignment with the owner. Upon demonstrating to the dog, how the dog can choose to walk in pace with the person, the dog is able to unify with the person, as well as any other dogs that may be present. The dog experiences the walk as a member of a collective strength created and shared by a unified pack. With the dog able to acknowledge the person as the Alpha, the relationship is in balance. When the dog can respect the person as the authority, the dog can be taught to do anything.

In a presently preferred example, and by way of example and not limitation, the positioning strap is used with several types of dog collars, including training and choke-style (i.e., cinch or Martingale). Use with flat collars is possible; however, they are not a preferred type of collar for use with the positioning strap.

In a presently preferred embodiment, the positioning strap is a piece of flat elastic cord measuring approximately 8 mm wide and 2 mm thick. Other materials suitable for the positioning strap include leather, cloth, canvas, rope, rubber, hook and loop fastening strap, Serasoft™ fabric, synthetic dog hair, as well as elastic cords of various configurations, including flat, crimped, waved, and with or without inside rubber.

Preferably, the strap may be provided in three predetermined lengths, 16 cm (medium), 18 cm (large), and 20 cm (extra-large). These three lengths are sufficient to fit the majority of dog breeds. Owners having dogs of different sizes may prefer a positioning strap offering variable lengths. One mechanism to obtain such variance is through a buckle attachment of the positioning strap to the O-ring, instead of the manner of attachment described below.

A bead/strip/line of rubber having a width of 2 mm preferably extends along the middle on one side of the strap. While not essential to the practice of the present invention, the rubber assists in maintaining the position of the strap 108 over the dog's nose because of its frictional interaction with the dog's fur.

An O-ring 120 may be attached at each end of the positioning strap 108, preferably by extending the strap through the ring and doubling it back on itself, where it is secured, such as by a rivet. This manner of attachment is sufficiently loose that the positioning strap may freely move relative to the O-ring. Use of the O-ring is not essential to the practice of the present invention; however, its ability to allow flexibility and movement while connecting the positioning strap to the dog collar is advantageous. Each of the O-rings is preferably a flat metal ring of approximately 1.5 mm in thickness with an inside diameter of 15 mm. Other materials considered acceptable for the O-ring include plastic, cloth, rope, elastic cord, and leather. Additionally, instead of an "O" shape, the O-ring 120 connector could also be in the form of a D-style ring, a square-shaped ring or a triangular-shaped ring.

An attachment loop may connect the positioning strap and O-ring to the dog collar. The specific location of attachment on the collar may vary depending upon the size and shape of the dog's head and neck, and the attachment loop must accommodate such variance. A presently preferred connector consists of a 3 mm thick elastic cord loop of approximately 18 mm in diameter. Folding the loop in half forms a diploidic linear section of elastic cord of approximately 7 cm in length. A button of 1 cm in diameter is attached to the proximal end of the diploidic section, for example, by way of sewing, using a 1/16-inch tie-wrap, a combination thereof or the like. At approximately 2 mm from the distal end of the diploidic section, a piece of elastic (e.g., rubber) tubing, a stick element or the like pinches the section, forming an eyelet. A bead may preferably be used in place of the heat shrink tubing.

As illustrated in FIGS. 11A-12B, the button end of the diploidic section may be knotted to the O-ring. The remaining length of the diploidic section extends around a linear section of the dog collar in an "under then over" configuration. Once wrapped around the collar, insertion of the button into the eyelet secures attachment of the dog collar to the positioning strap.

Other suitable materials to fabricate the attachment loop 122 include diploidic and non-diploidic rubber, hook and loop strap, plastic leather, cloth, canvas, and rope. Additionally, instead of the eyelet/button attachment mechanism described above, securement can rely upon plastic snaps, hook and loop attachment, a buckle attachment, and glue. The attachment loop can also be secured to the O-ring using rivets, sewing, gluing, crimping, and the like.

It is further contemplated to provide a non-removable (or permanent) connection between the attachment loop and the dog collar. This strategy would provide a single, combined dog collar and positioning strap product. Also contemplated is providing a manner of attachment of the attachment loop to the collar that enables variance in the length of the attachment loop, permitting further adjustment of the product on the dog's head and neck.

With reference to FIGS. 1, 14 and 16, certain preferred embodiments of a dog restraining apparatus 100 may comprise a dog collar 104 and a collar positioning assembly 102. The dog collar 104 may have a leash attachment location 146, and may be configured to attach to a leash 106 at the leash attachment location 146 behind a dog's head (see, for example, FIG. 23) when the dog collar 104 is secured around the dog's neck.

The collar positioning assembly 102 includes an alignment strap 108 (also referred to herein as a "positioning strap"). With reference to FIG. 16, the alignment strap 108 may have a pair of strap ends 110 and a strap length defined therebetween. Each strap end 110 may be attached to the dog collar 104 at a respective collar attachment location (e.g., 142 and 144) such that the alignment strap 108 is extendable across the dog's nose bridge 158 when the dog collar 104 is secured around the dog's neck (see, for example, FIG. 19).

Referring to FIG. 1, one or both of the collar attachment locations (142, 144) may be adjustable along the dog collar (e.g., in directions 170).

Referring to FIGS. 1-4, the alignment strap 108 may preferably have an interior surface 112 and an elastomeric frictional engagement element 114 disposed and exposed thereon. The elastomeric frictional engagement element 114 may take various forms and follow various pathways along the alignment strap 108. For example, the frictional engagement element 114 may follow a linear pathway as shown at 114a in FIG. 2, or a more tortious pathway as illustrated at 114b in FIG. 3. It may be disposed along the strap element 108 in a continuous configuration, or non-continuous configuration such as with dots or dashes.

The alignment strap 108 may preferably be elastic. In addition or in the alternative, the strap length may be selectively adjustable (e.g., by way of a buckle or hook-and-loop fastener mechanism. Moreover, the collar positioning assembly 102 may be readily detachable from, and re-attachable to, the dog collar 104.

The collar positioning assembly 102 may further include a pair of collar attachment loops 122. Each collar attachment loop 122 may be convertible between an opened configuration (see, for example, FIGS. 9A and 11A) and a closed configuration (see, for example, FIGS. 10A and 12A). In such embodiments, the attachment of each strap end 110 to the dog collar 104 may be by way of received retention of the dog collar 104 by a respective one of the collar attachment loops 122 in its closed configuration. See, for example, FIG. 16. The size of the collar attachment loops 122 may be adjustable. Each collar attachment loop 122 may be securable in its closed configuration by way of a buckle, hook-and-loop fastener, button-and-eyelet mechanism, a combination thereof, or the like.

Referring to FIGS. 11A-12B, one or both of the collar attachment loops 122 may include a button 138 and an eyelet 140 for removably receiving the button 138. Alternatively, referring to FIGS. 9A-10B, one or both of the collar attachment loops 122 may include a buckle 128 and cinch securement strap 124 with a rear surface 132 of the securement strap 124 being securable to the top surface 134 by way of, for example, hook-and-loop fastener.

Referring to FIGS. 1 and 16, the alignment strap 108 may have an end loop 116 formed at each strap end 110. In such case, the attachment of the strap ends to the dog collar 104 may be way of the end loops 116. The collar positioning assembly 102 may further include a pair of O-rings 120. Each such O-ring may be connectingly disposed between a respective one of the end loops 116 and the dog collar 104. Each O-ring may be circumferentially rotatable (e.g., in directions 172 of FIG. 1) through its respective end loop 116.

Figure 25:
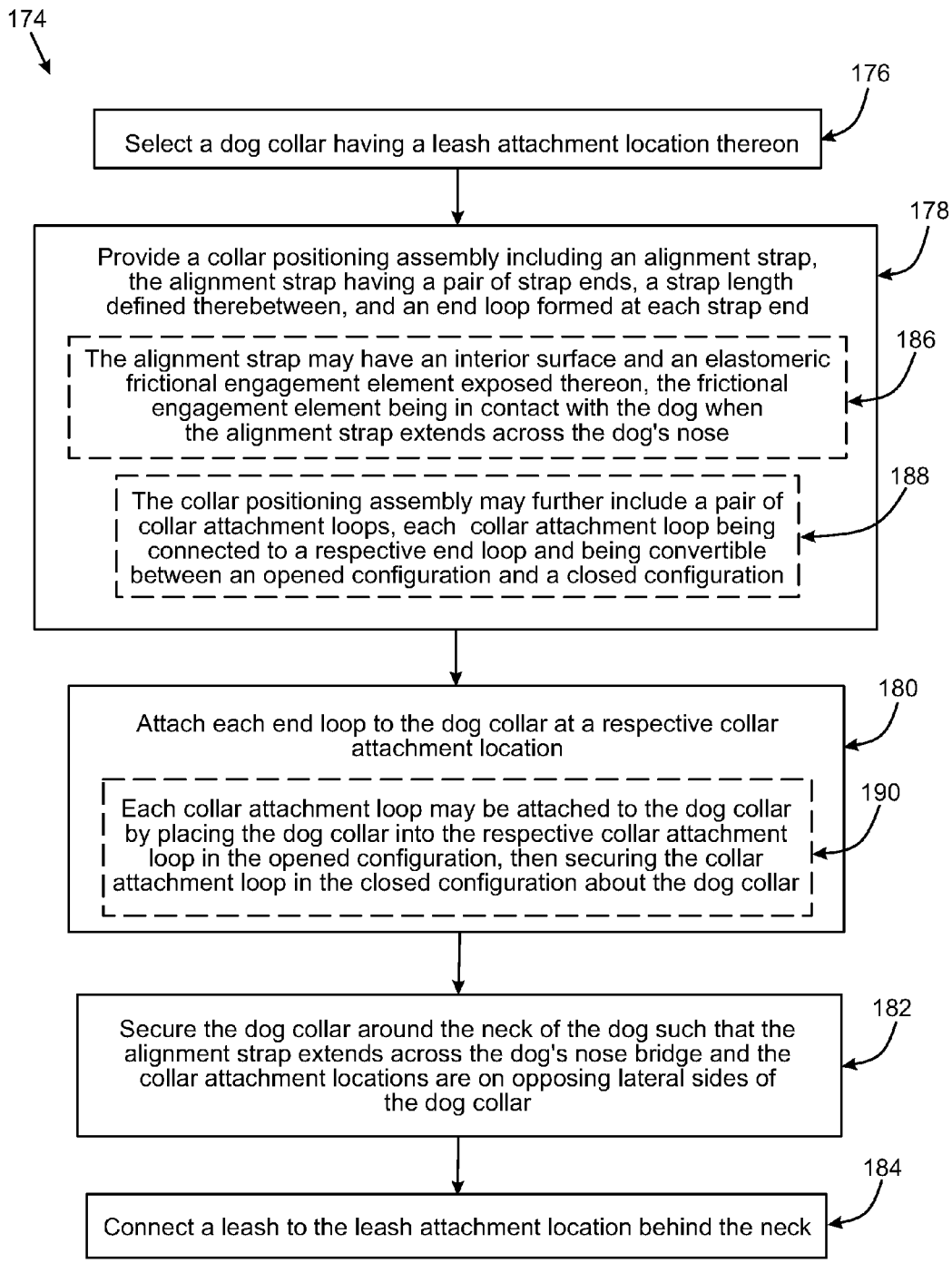
FIG. 25 is a diagrammatic flow chart illustrating a method of deploying a dog restraining apparatus on a dog in accordance with one or more non-limiting embodiments of the present invention.

Referring to FIG. 25, a method 174 of deploying a dog restraining apparatus 100 on a dog may comprise a series of steps, not necessarily in the order presented below. As shown in block 176, a dog collar 104 having a leash 146 attachment location thereon may be selected. As shown in block 178, a collar positioning assembly 102 may be provided which includes an alignment strap 108. The alignment strap 108 may have a pair of strap ends 110, a strap length defined therebetween, and an end loop 116 formed at each strap end 110. As shown in block 180, each end loop 116 may be attached to the dog collar 104 at a respective collar attachment location (142, 144). As shown in block 182, the dog collar 104 may be secured around the neck of the dog such that the alignment strap 108 extends across the dog's nose bridge 158 and the collar attachment locations (142, 144) are on opposing lateral sides of the dog collar 104 (see, for example, FIGS. 19 and 20). As shown at block 184, a leash may be connected to the leash attachment location behind the neck (see, for example FIG. 23).

As shown at, for block 188, in a method 174, the alignment strap 108 may have an interior surface 112 and an elastomeric frictional engagement element 114 exposed thereon. In such case, the frictional engagement element 114 may be in frictional contact with the dog when the alignment strap 108 extends across the dog's nose.

As shown at block 188, in the step of providing 178, the collar positioning assembly 102 may further include a pair of collar attachment loops 122. Each collar attachment loop 122 may be connected to a respective end loop 116 and may be convertible between an opened configuration and a closed configuration. As shown at block 190, in the step of attaching 180, each collar attachment loop 122 may be attached to the dog collar 104 by placing the dog collar 104 into the respective collar attachment loop 122 in the opened configuration, then securing the collar attachment loop 122 in the closed configuration about the dog collar.

While embodiments of the invention have been illustrated and described, it is not intended that these embodiments illustrate and describe all possible forms of the invention. Various changes, modifications, and alterations in the teachings of the present invention may be contemplated by those skilled in the art without departing from the intended spirit and scope thereof. It is intended that the present invention encompass such changes and modifications.

What is claimed is:

1. A dog restraining apparatus comprising:
a dog collar having a leash attachment location, and being configured to attach to a leash at the leash attachment location behind a dog's head when the dog collar is secured around the dog's neck; and
a collar positioning assembly including an alignment strap, the alignment strap having a pair of strap ends and a strap length defined therebetween, each strap end being attached to the dog collar at a respective collar attachment location such that the alignment strap is extendable across the dog's nose bridge when the dog collar is secured around the dog's neck;
wherein
(a) the collar positioning assembly further includes a pair of collar attachment loops, each collar attachment loop being convertible between an opened configuration and a closed configuration; and
(b) the attachment of each strap end to the dog collar is by way of received retention of the dog collar by a respective one of the collar attachment loops in its closed configuration.

2. An apparatus as defined in claim 1 in which the alignment strap has an interior surface and an elastomeric frictional engagement element exposed thereon.

3. An apparatus as defined in claim 1 in which the alignment strap is elastic.

4. An apparatus as defined in claim 1 in which the strap length is selectively adjustable.

5. An apparatus as defined in claim 1 in which the collar positioning assembly is readily detachable from, and re-attachable to, the dog collar.

6. An apparatus as defined in claim 1 in which one or both of the collar attachment locations are adjustable along the dog collar.

7. An apparatus as defined in claim 1 in which one or both of the collar attachment loops includes a button and an eyelet for removably receiving the button.

8. An apparatus as defined in claim 1 in which the size of the collar attachment loops are adjustable.

9. An apparatus as defined in claim 1 in which the alignment strap has an end loop formed at each strap end, and the attachment of the strap ends to the dog collar is by way of the end loops.

10. An apparatus as defined in claim 9 in which the collar positioning assembly further includes a pair of O-rings, each O-ring being connectingly disposed between a respective one of the end loops and the dog collar.

11. An apparatus as defined in claim 10 in which each O-ring is circumferentially rotatable through its respective end loop.

12. A collar positioning assembly for aligning a dog collar secured around the neck of a dog when a leash is attached to the dog collar behind the dog's head, the collar positioning assembly comprising:
an alignment strap, the alignment strap having a pair of strap ends, a strap length defined therebetween, and an end loop formed at each strap end, each end loop being removably attachable to the dog collar at a respective collar attachment location such that the alignment strap is extendable across the dog's nose bridge when the dog collar is secured around the neck; and
a pair of collar attachment loops, each collar attachment loop being convertible between an opened configuration and a closed configuration;
wherein the attachability of each end loop to the dog collar is by way of received retention of the dog collar by a respective one of the collar attachment loops in its closed configuration.

13. An assembly as defined in claim 12 in which the alignment strap has an interior surface and an elastomeric frictional engagement element exposed on the interior surface.

14. An assembly as defined in claim 12 in which one or both of the collar attachment locations are adjustable along the dog collar.

15. An assembly as defined in claim 12 in which each collar attachment loop is securable in its closed configuration by way of a buckle, hook-and-loop fastener or button-and-eyelet mechanism.

16. An assembly as defined in claim 12 further comprising a pair of O-rings, each O-ring being connectingly disposed between a respective one of the end loops and a respective one of the collar attachment loops.

17. A method of deploying a dog restraining apparatus on a dog, the method comprising the steps of:
selecting a dog collar having a leash attachment location thereon;
providing a collar positioning assembly including an alignment strap, the alignment strap having a pair of strap ends, a strap length defined therebetween, and an end loop formed at each strap end;
attaching each end loop to the dog collar at a respective collar attachment location;
securing the dog collar around the neck of the dog such that the alignment strap extends across the dog's nose bridge and the collar attachment locations are on opposing lateral sides of the dog collar; and
connecting a leash to the leash attachment location behind the neck;
wherein
(a) in the step of providing, the collar positioning assembly further includes a pair of collar attachment loops, each collar attachment loop being connected to a respective end loop and being convertible between an opened configuration and a closed configuration; and (b) in the step of attaching, each collar attachment loop is attached to the dog collar by placing the dog collar into the respective collar attachment loop in the opened configuration, then securing the collar attachment loop in the closed configuration about the dog collar.

18. A method as defined in claim 17 in which the alignment strap has an interior surface and an elastomeric frictional engagement element exposed thereon, the frictional engagement element being in contact with the dog when the alignment strap extends across the dog's nose.

* * * * *